United States Patent

[11] 3,595,098

| [72] | Inventor | Araya Kumakichi<br>No. 2, Daishoji Seki-machi, Kaga-shi<br>Ishikawa-prefecture, Japan |
|---|---|---|
| [21] | Appl. No. | 838,182 |
| [22] | Filed | July 1, 1969 |
| [45] | Patented | July 27, 1971 |
| [32] | Priority | Feb. 24, 1969 |
| [33] | | Japan |
| [31] | | 44/15,551 |

[54] PIN LINK PLATE OF CHAIN HAVING A DETENT MEANS FOR PIVOT PIN
3 Claims, 4 Drawing Figs.

[52] U.S. Cl. ............................................... 74/250
[51] Int. Cl. ............................................. F16g 13/02
[50] Field of Search........................................ 74/245,
250, 251, 255, 256

[56] References Cited
UNITED STATES PATENTS
1,511,822  10/1924  Belcher ....................... 74/245 X
FOREIGN PATENTS
564,248  10/1923  France ........................ 74/245
999,900  10/1951  France ........................ 74/251

Primary Examiner—Leonard H. Gerin
Attorneys—Robert E. Burns and Emmanuel J. Lobato ABSTRACT: This invention relates to a pin link plate of chain having detent means for receiving a pivot pin inserted into an end opening thereof. The detent means includes a plurality of ridges and depressions disposed alternately along a top edge of a tubular swaged portion formed around each opening perforated through the link plate and the projected end portion of the pivot pin is peened over the ridges and depressions of the swaged portion.

PATENTED JUL 27 1971

3,595,098

PIN LINK PLATE OF CHAIN HAVING A DETENT MEANS FOR PIVOT PIN

DESCRIPTION OF THE PRIOR ART

In operation of roller chains and the like, which are widely used for conveyor systems in workshops, factories and warehouses, and for power transmission systems on vehicles, a portion of the chain in mesh with a sprocket will be flexed through a rotational movement of the bushing secured on a roller link plate relative to the pivot pin secured on a pin link plate. At this time, there will be a mutual rubbing contact between the bushing and the pivot pin, and a pressure in the contact surface will produce a pulling force, thereby producing a rotating movement of the roller link plate with reference to the pin link plate.

When the roller link plate, the pivot pin, and the bushing are worn down respectively, there will be produced an unnecessary gap between each member which tends to develop a breakdown or disassembling of the chain in the worst case. Therefore, it is necessary to completely secure the pivot pin and the bushing on the pin link plate and the roller link plate respectively. In the prior art, the pivot pin is usually press fitted into the opening provided on the pin link plate in order to secure the pivot pin to the latter. If during assembly the allowance or shrinkage of the press fit becomes excessive in an effort of obtaining a tight fit, there will be produced a fracture, damage and deformation in the circumferential area of the opening of the link plate thereby reducing the efficiency of the press fit.

SUMMARY OF THE INVENTION

The present invention relates to a link plate of chain, more particularly to a pin link plate of chain having a detent means for a pivot pin.

A principal object of the present invention is to provide a method of securing the pivot pin onto the pin link plate of the chain firmly.

Another object of the present invention is to provide a method of press fitting the pivot pin into the opening of the pin link plate of the chain without causing any fracture, or damage on the pivot pin or opening of the link plates to occur.

Still another object of the present invention is to provide a pin link plate member which is rugged, inexpensive and simple in construction.

According to the present invention, there is provided a pin link plate of chain having a detent means for a pivot pin, comprising two swaged portions each formed around an opening perforated through a flat plate so as to protrude from one side thereof, said swaged portion being provided with a plurality of ridges and depressions disposed alternately along the top edge thereof. The depths of the depressions are formed smaller than the height of the swaged portions and the projected end portion of the pivot pin which is press fitted into each opening is peened over the ridges and depressions of its associated swaged portion.

DESCRIPTION OF THE PREFERRED EMBODIMENT

Figure 1:
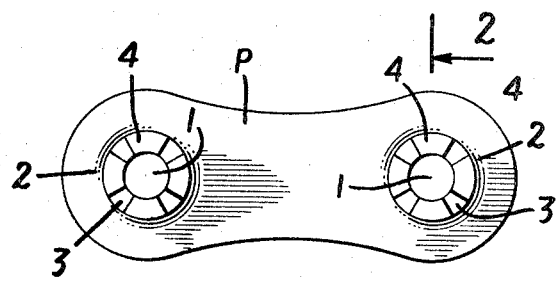
FIG. 1 is a top plane view showing a pin link plate according to the present invention.
Figure 2:
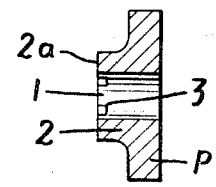
FIG. 2 is a cross-sectional view taken along a line II–II in FIG. 1.
Figure 3:
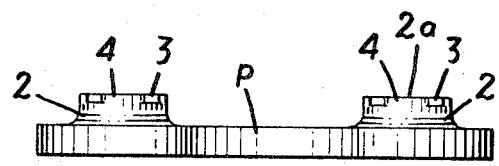
FIG. 3 is a side elevational view showing the pink link plate as sown in FIG. 1.
Figure 4:
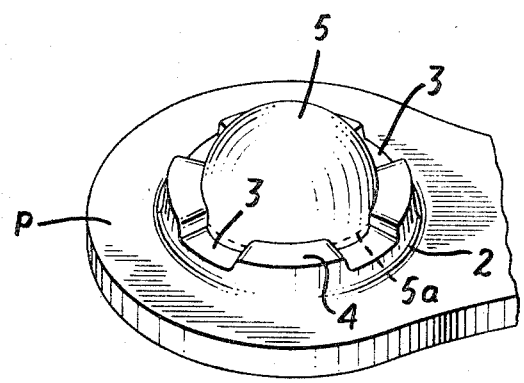
FIG. 4 is a perspective view showing a portion of the pivot pin and the pin link plate is press fitted and peened condition.

Referring more particularly to drawings, the preferred embodiment of present invention will be described;

FIG. 1 shows a pin link plate formed from a flat plate P having opposed major sides or surfaces by providing two swaged tubular portions 2 thereon around openings 1 perforated therethrough adjacent both ends thereof by a process of plastic shaping so as to protrude from one side thereof as shown in FIG. 2 and 3. A plurality of ridges 4 and depressions 3 are formed alternately along the distal top edge 2a of each swaged portion 2 as shown in FIG. 3. As seen in FIG. 1, four ridges and four depressions are shown. The depth of the depressions 3 are made smaller than the height of the swage portion 2. As shown in FIG. 4, each end of a pivot pin 5 is completely secured to the flat plate P by peening the former over the latter so as to have a projected end portion 5a of the pivot pin 5 well upset over the ridges 4 and depressions 3 of the swaged portion 2.

As shown hereinabove, according to the present invention, since the swaged portions 2 having a plurality of circumferentially spaced-apart 4 and depressions 3 along the distal top edges 2a thereof are provided in one side thereof around both openings 1, the contact area between the pivot the flat plate P along the opening 1 will be much increased in contrast to the prior art connection therebetween, thus permitting the pivot pin 5 to be fully pressfitted and locked in place when inserted into the opening 1. Also, the stress concentration around the opening 1 will be alleviated by increasing the contact area between the pivot pin 5 and the opening 1. Since the strength of the pin link plate itself is increased as compared to that of conventional link plates as well as preventing the fracture and damage of the pivot pin 5 and the opening 1, pin link plates of lighter construction may be used without difficulties if they are subjected to loads equal to that applied on conventional link plates. Since the pivot pin 5 is fully press fitted into the opening 1 in addition to both ends thereof being peened over the ridges 4 and depressions 3 of the swaged portion 2 of the link plate, there will be no shaking of the pivot pin 5 within the opening 1. Since the swaged portions 2 together with ridges 4 and depressions 3 disposed alternately along the top edges 2a thereof are formed relatively easily, it is possible to provide rugged and inexpensive pin link plates to the consumers.

The present invention has now been disclosed by way of the present illustrative embodiments, it is understood, however, that numerous changes in design, structure, and arrangement may be made without departing from the scope of the invention.

What I claim is:

1. A pin link plate of chain having means for receiving a pivot pin comprising: a flat plate having means therein defining a plurality of openings, a swaged portion formed around each said opening and protruding from one side of said flat plate, each said swaged portion having a plurality of ridges and depressions alternately disposed along a top edge thereof, and wherein the depth of said depressions is less than the height of said swaged portions, whereby the projected end portion of the pivot pin may be press fitted into each opening and peened over the ridges and depressions of said swaged portion.

2. A pin link plate connectable to pivot pins comprising: an elongated flat plate member having opposed major surfaces and having means therein at each end thereof defining an opening dimensioned to receive therethrough a pivot pin; and a tubular portion surrounding each said opening extending outwardly from one of said major surfaces and having at its distal end a plurality of circumferentially spaced-apart ridges cooperative together to lock in place a pivot pin inserted through their associated opening.

3. A pin link late according to claim 2; including means defining a plurality of circumferentially spaced-apart depressions in said distal end of each tubular portion alternately disposed between said ridges, each said depression extending towards said flat plate and having a length of extent less than that of said tubular portions.